(12) United States Patent
Kim (10) Patent No.: US 8,503,935 B2
(45) Date of Patent: Aug. 6, 2013

(54) TERMINAL AND METHOD FOR CONTROLLING FUNCTION USING SHORT-DISTANCE COMMUNICATION

(75) Inventor: Nam Il Kim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 90 days.

(21) Appl. No.: 12/927,589

(22) Filed: Nov. 18, 2010

(65) Prior Publication Data

US 2011/0117843 A1    May 19, 2011

(30) Foreign Application Priority Data

Nov. 18, 2009  (KR) .................. 10-2009-0111624

(51) Int. Cl.
*H04B 7/00* (2006.01)
(52) U.S. Cl.
USPC ................ 455/41.2; 455/41.1; 455/552.1

(58) Field of Classification Search
USPC .............. 455/41.1–41.3, 552.1, 556.1, 566
See application file for complete search history.

(56) References Cited

U.S. PATENT DOCUMENTS

| 8,036,650 | B2 * | 10/2011 | Jang | 455/420 |
| 2005/0174494 | A1 * | 8/2005 | Takenaka | 348/734 |
| 2008/0111727 | A1 * | 5/2008 | Kim | 341/176 |

* cited by examiner

*Primary Examiner* — Tuan H Hguyen (57) ABSTRACT

A method, apparatus, and a non-transitory computer readable medium allows a terminal to concurrently receive control input from multiple secondary devices through a short distance communication mode. The terminal is connected with at least two secondary devices in the short distance communication mode. A key map is applied to the connected secondary devices. When a key signal is received from at least one of the connected secondary devices, the secondary device that transmitted the key signal is identified. And a function mapped to the key signal is executed according to the key map applied to the identified secondary device.

20 Claims, 8 Drawing Sheets

TERMINAL AND METHOD FOR CONTROLLING FUNCTION USING SHORT-DISTANCE COMMUNICATION

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Nov. 18, 2009, and assigned Serial No. 10-2009-0111624, the entire disclosure of which is hereby incorporated by reference.

TECHNICAL FIELD OF THE INVENTION

The present invention relates to a terminal connecting with a secondary device using short distance communication such as Bluetooth® communication and a method for controlling a function therein. In particular, the present invention relates to a terminal that connects with a secondary device using short distance communication such as Bluetooth® communication and a method for executing a function according to a key signal from a plurality of secondary devices.

BACKGROUND OF THE INVENTION

With increased spreading of terminal use, data communications for receiving and holding data for other persons by a user terminal, or transmitting user's data to another terminal, has been developed. There are short distance communication means (such as cable communication, infrared communication, or Bluetooth® communication) and long distance communication means (such as a wireless LAN) of data communication. Short distance communication is achieved between terminals that are within close proximity, and long distance communication is achieved between long distance terminals.

In the Bluetooth® communication, communication devices located within 10 meters (m) are connected to each other, and may transmit and receive data using a wireless communication standard that enables two-way communication in a real-time manner. Bluetooth® is a registered trademark owned by the Bluetooth® SIG. A terminal can exchange data using an Industrial Scientific Medical (ISM) band of 2.4 GHz with other communication devices at a speed of 1 Mbps without cable connection according to Bluetooth® communication. A secondary device such as a headset, a hands-free, and a remote controller are examples of communication devices that can connect with a terminal using Bluetooth® communication.

A connection method between the terminal and the secondary device through Bluetooth® communication is as follows.

When a user selects a Bluetooth® function, a terminal searches for secondary devices within close proximity that are capable of performing a peripheral Bluetooth® function. When a user selects a desired secondary device among detected secondary devices, the terminal transmits a signal requesting Bluetooth® connection to the selected secondary device. At this time, the terminal transmits includes a user's address in the signal.

When the secondary device receives a signal requesting the connection, it transmits a response signal including the user's address to the terminal. The secondary device may also transmit type information indicating whether it is a headset, an earphone, or a portable terminal, the number of keys that it has, and information with respect to mapped functions by keys. When the terminal receives the information, it checks an address of the secondary device identified in the response signal and calls the secondary device using the checked address.

Upon receiving the response signal from the called secondary device, the terminal executes wireless communication connection according to a profile. Next, the terminal and the secondary device form a link for transmitting and receiving data. In addition, the terminal and the secondary device transmit and receive data through the formed link. The terminal and the secondary device connected through Bluetooth® communication will now be illustrated in detail with reference to FIG. 1. The secondary device is described assuming that it is a headset.

Figure 1:
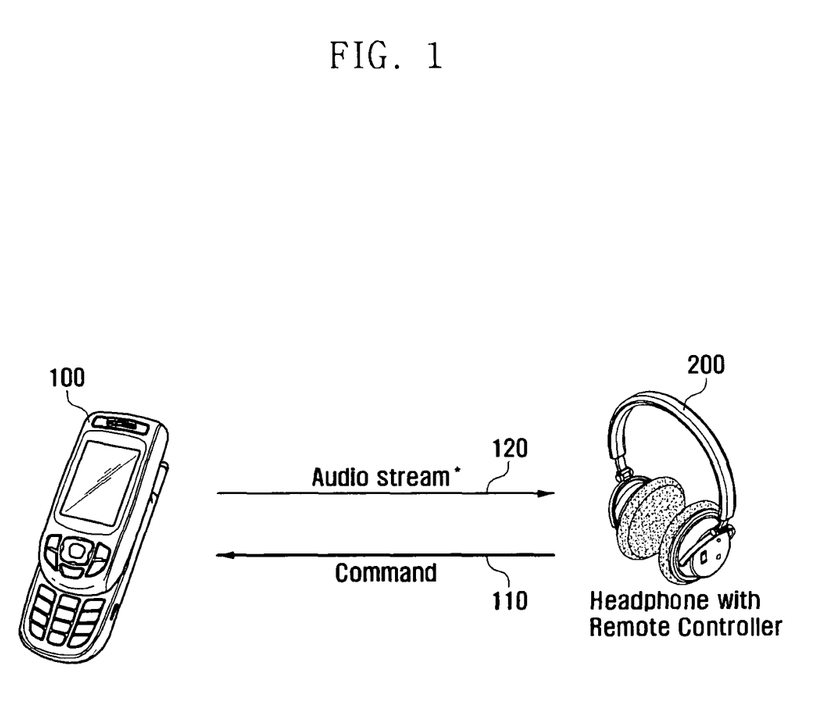
FIG. 1 illustrates a terminal and a secondary device connected by Bluetooth® communication according to the present disclosure.

FIG. 1 illustrates a terminal and a secondary device connected by Bluetooth® communication according to the principles of the present disclosure.

Referring to FIG. 1, a terminal 100 connects with a headset 200 (i.e. a secondary device) using Bluetooth® communication. When the terminal 100 receives a command 110 requesting music data to be output from the headset 200, it transmits an audio stream 120 corresponding to the music requested to the headset 120.

In general, at least one secondary device is connected to a terminal using Bluetooth® communication. Further, the terminal may execute a function according to a control signal received from the secondary device. However, when multiple secondary devices connect with one terminal, the terminal may transmit specific data to the secondary devices but may not execute a function according to a control signal received from the secondary device.

SUMMARY OF THE INVENTION

To address the above-discussed deficiencies of the prior art, it is a primary object to provide a function control method using short distance communication, and a terminal executing the same.

In accordance with an aspect of the present invention, a function control method of a terminal using short distance communication includes connecting with at least two secondary devices in a near distance mode and applying a key map to the connected secondary devices. When a key signal is received from at least one of the connected secondary devices, the method the secondary device from which the key signal is transmitted. And a function mapped to the key signal is executed according to the key map applied to the identified secondary device.

In accordance with another aspect of the present invention, a function control terminal includes a short distance communication unit for receiving a key signal from at least one of at least two connected secondary devices in a short distance communication mode. A controller applies a key map to the connected secondary devices, identifies the secondary device from which the key signal is transmitted when the key signal is received, and executes a function mapped to the key signal according to the key map applied to the checked secondary device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device. Detailed descriptions of well-known functions and structures incorporated herein may be omitted to avoid obscuring the subject matter of the present invention.

As used herein, the term "terminal" refers to an information-processing device that may generate or store data and exchange data with external devices. Here, the terminal can be a portable terminal, a computer, a note book computer, an MPEG Audio Layer-3 (MP3), or a Portable Multimedia Player (PMP), and may connect with other terminals using short distance communication such as Bluetooth® communication. The terminal is described assuming that it is the portable terminal.

As used herein, the "secondary device" refers to a device that may output data received from a terminal connected using short distance communication, and transmit a control signal selected by a user to the connected terminal. Here, the secondary device may become a headset, an earphone, a game remote controller, or another terminal. For illustrative purposes only, the present disclosure assumes that a secondary device is the headset. However, the present disclosure is not meant to limit the scope of secondary devices to a headset.

Figure 2:
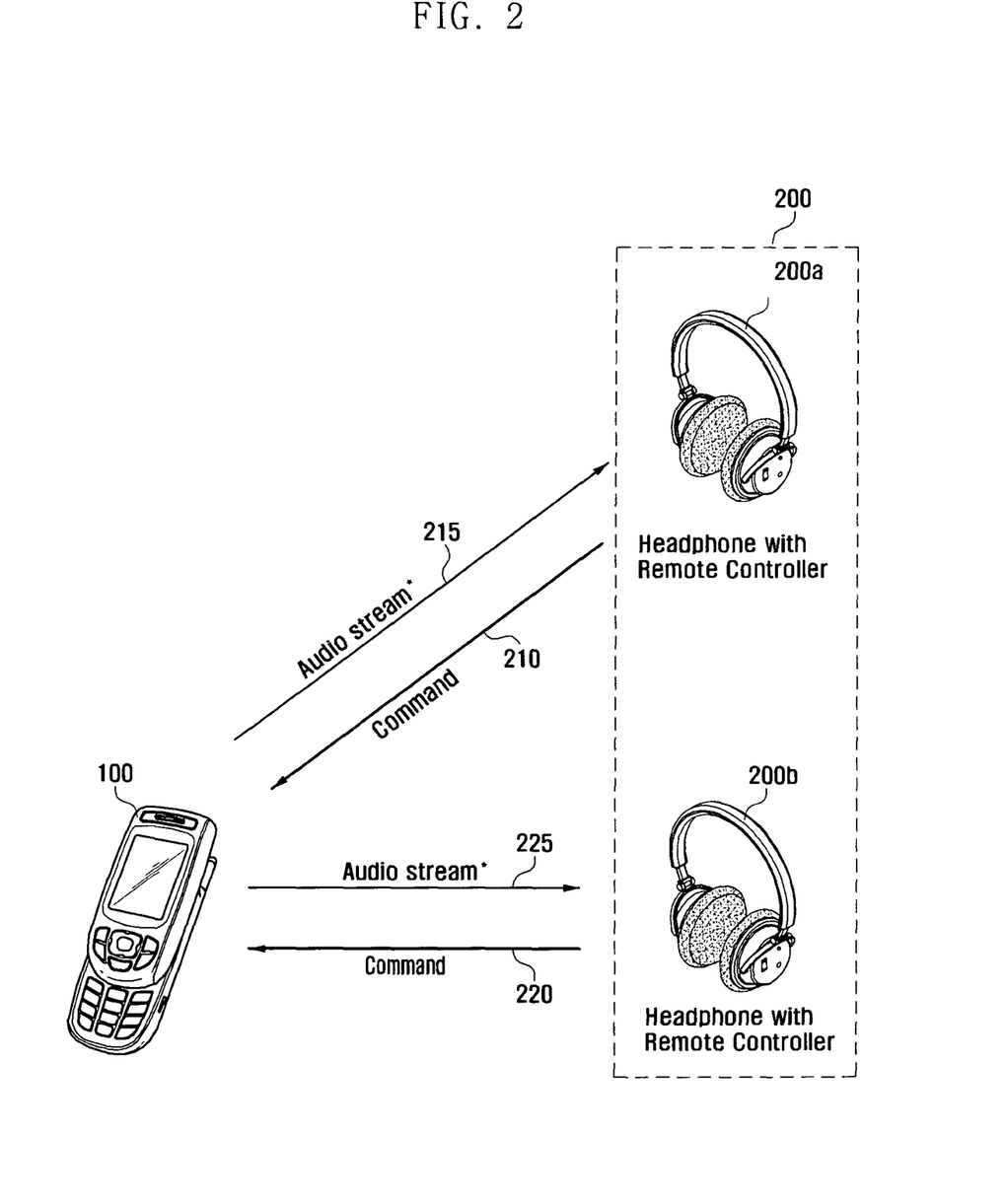
FIG. 2 illustrates a system executing function control according to an embodiment of the present invention.

FIG. 2 illustrates a system executing function control according to an embodiment of the present invention.

Referring to FIG. 2, a terminal 100 may connect with a plurality of secondary devices. In detail, the terminal 100 executes a pairing with a first secondary device 200a to establish a connection. Next, the terminal 100 executes a pairing with a second secondary device 200b to establish a connection. The terminal 100 forms respective links to exchange data with the first and second secondary devices 200a and 200b. In addition, the terminal 100 stores respective addresses of the first and second secondary devices 200a and 200b. As illustrated above, the terminal 100 connecting with two secondary devices 200a and 200b executes functions according to control signals received from the first and second secondary devices 200a and 200b, respectively.

As shown in FIG. 2, when the terminal 100 receives a command 210 requesting data from the first secondary device 200a, it transmits an audio stream 215 according to the received command 210. Meanwhile, when the terminal 100 receives a command 220 requesting data from the second secondary device 200b, it transmits an audio stream 225 according to the received command 210. At this time, the first secondary device 200a and the second secondary device 200b transmit respective commands 210 and 220 including unique identification information such as a user's address to the terminal 100. Accordingly, the terminal 100 may compare respective addresses including the commands 210 and 220 with a stored address to discriminate the secondary device transmitting the command 210 or 220.

A configuration of the terminal executing a function according to a key signal received from a plurality of secondary devices 200 is described with reference to FIG. 3.

Figure 3:
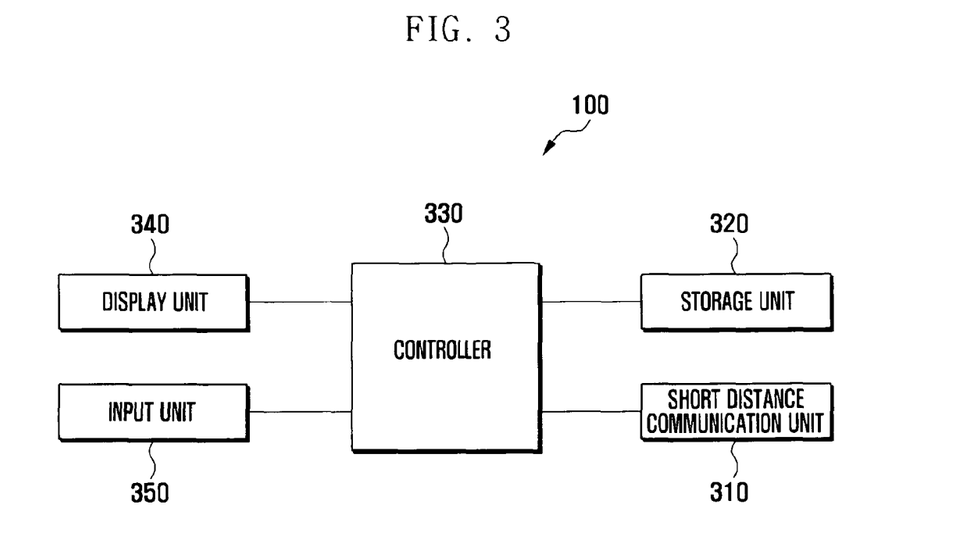
FIG. 3 illustrates a schematic configuration of a terminal according to an embodiment of the present invention.

FIG. 3 illustrates a schematic configuration of a terminal according to an embodiment of the present invention.

Referring to FIG. 3, the terminal 100 may include a short distance communication unit 310, a storage unit 320, a controller 330, a display unit 340, and an input unit 350. The short distance communication unit 310, the controller 330, and the input unit 350 of the terminal 100 will also be referred as a first short distance communication unit 310, a first controller 330, and a first input unit 350 to distinguish from those of the secondary device 200.

The first short distance communication unit 310 exchanges data with another device in a predetermined zone. Various wireless short distance communication modules such as a Bluetooth® module, a Zigbee module, an RFID module, and a WI-Fi module can be used as the first short distance communication unit 310. Here, the Bluetooth® module can be used as the first short distance communication unit 310. Furthermore, the first short distance communication unit 310 may exchange a key signal and data such as voices or images for controlling a function under the control of the first controller 330 with a secondary device 200 such as a headset, a hands-free, a game dedicated remote controller, or a portable terminal capable of performing Bluetooth® communication.

The storage unit 320 may store an application executed in the terminal 100 and all types of data. Here, the storage unit 320 stores a key map necessary for an application that may be executed in the terminal 100. The key map includes information with respect to the number of keys necessary for each function executed in the application and information with respect to functions mapped to respective keys.

The first controller 330 executes a function for controlling states and operation of structural elements constituting the terminal 100. The first controller 330 controls the first short distance communication unit 310 in a short distance communication mode to connect the terminal 100 with a plurality of secondary devices 200 according to user input. The first controller 330 may control the display unit 340 to display the types of a plurality of connected terminals 200. Namely, the first controller 330 may display whether the connected secondary device 100 is a headset, an earphone, or a terminal to indicate what the connected secondary device 200 is to the user. Moreover, the first controller 330 may execute a function according to a key signal received from the plurality of secondary devices 200. To do this, the first controller 330 should apply a key map to respective secondary devices 200 according to key information of the connected secondary device 200.

When the first controller 330 calls a secondary device 200 to be connected according to the user selection, the first controller 330 checks whether there is another secondary device 200 connected to the terminal 100. When another secondary device 200 is already connected to the terminal 100, the first controller 330 displays an indication (e.g. using a pop-up window) that there is a previously connected secondary device 200. The previously connected secondary device 200 refers to the first secondary device 200a, and a next secondary device requesting to be connected refers to the second secondary device 200b.

When multi-connection is selected to connect the terminal 100 with at least two secondary devices 200 according to the user selection, the first controller 330 connects with the second secondary device 200b. At this time, the first controller 330 stores respective addresses received from the first secondary device 220a and the second secondary device 200b in the storage unit 320 or a buffer (not shown). In addition, the first controller 330 determines whether a currently executed application in the terminal 100 is an application supporting a multi-key. That is, the controller 330 checks whether the currently executed application is an application (such as a game) that is capable of simultaneously executing functions according to a plurality of key signals input from multiple users.

When the currently executed application is an application that supports a multi-key, the first controller 330 checks the key information of the first secondary device 200a and the key information of the second secondary device 200b. The first controller 330 may also apply a key map by secondary devices 200 according to the checked key information. For example, the first secondary device 200a and the second secondary device 200b may be game-dedicated remote controllers, and a game application may be currently executed in the terminal 100. Moreover, the first secondary device 200a may include nine keys (or buttons), and the second secondary device 200b may include five keys (or buttons) with arrow keys. In the following example, it is assumed that four keys are used to execute a game function in the game application.

Accordingly, the first controller 330 checks key information of a connected secondary terminal 200. Furthermore, the first controller 330 applies a key map associated with each of the secondary devices 200a and 200b according to the checked key information. Namely, the first controller 330 applies a key map with respect to four keys necessary to execute a game function in the game application to respective secondary devices 200a and 200b. Because the first secondary device 200a includes nine keys, the first controller 330 applies a key map to four of nine keys. Accordingly, the first controller 330 may disregard signals input from remaining keys except for the four keys to which the key map is applied in the first secondary device 200a. In the second secondary device 200b, the first controller 330 also applies a key map to four among five keys. Accordingly, the first controller 330 may disregard signals input from the remaining key except for the four keys to which the key map is applied in the second secondary device 200b.

Here, this embodiment has been described such that the first controller 300 applies a key map using key information received from each secondary device 200. However, the present invention is not limited thereto. That is, the first controller 330 may check types of respective secondary devices 200 and apply a corresponding key map according to a function to be executed in the respective secondary devices 200. For example, it is assumed that the first secondary device 200a is a headset, a second secondary device 200b is a game dedicated remote controller, and a currently executed application is a game application. It is also assumed that the first secondary device 200a includes five keys, and the second secondary device 200b includes nine keys with arrow keys. Further, it is assumed that the game application utilizes five keys to execute a game function, and needs two keys to control sound data generated while a game application is running.

Accordingly, the first controller 330 checks types and key information of the first secondary device 200a and the second secondary device 200b. The first secondary device 200a includes five keys and is a headset capable of outputting sound data. Accordingly, the first controller 330 checks the first secondary device 200a capable of outputting sound data generated during execution of a game function. Further, the first controller 330 applies a key map corresponding to the two keys for controlling the sound data to two among five keys included in the first secondary device 200a. Accordingly, the first controller 330 may output sound data generated during execution of the game function through the first secondary device 200a, and disregard signals input from remaining keys except for the two keys to which the key map is applied in the first secondary device 200a.

Next, the first controller 330 checks a second secondary device 200b capable of controlling a game function. Then, the first controller 330 applies a key map to five of the nine keys included in the second secondary device 200b to control a game function. Accordingly, when executing a game function in the game application, the first controller 330 may disregard signals input from the remaining keys of the second secondary device 200b except for the five keys to which a key map is applied.

The first controller 330 displays information with respect to keys of the keys of the respective secondary devices 200a and 200b mapped to the key map and information with functions that can be executed through the keys on the display unit 340. Accordingly, the user can look up the keys included in the respective secondary devices 200a and 200b to be used to control functions to be executed in the terminal 100.

The first controller 300 may execute a corresponding function according to a key signal received from a plurality of connected secondary devices 200a and 200b. In detail, when receiving the key signal, the first controller 330 identifies the secondary device 200 from which the signal has been received. The key signal includes an address of a secondary device 200 transmitting the key signal. Accordingly, the first controller 330 compares an address of the secondary device 200 included in the key signal with a stored address of the secondary device 200 to determine the secondary device 200 from which the key signal has been received. Moreover, the first controller 330 determines an appropriate function mapped to a key signal received through the key map applied to the secondary devices 200. Next, the first controller 330 executes the appropriate function.

The display unit 340 may display a function or a menu executed in the terminal 100. Moreover, the display unit 340 may use a Liquid Crystal Display (LCD). When the LCD is implemented by a touch screen, the display unit 340 can operate as the first unit 350. The display unit 340 may display a multi-connection selection window capable of selecting a connection with a plurality of secondary devices 200 under the control of the first controller 330. Moreover, the display unit 340 may display the types of the secondary devices connected through the multi-connection mode under the control of the controller 330.

The first input unit 350 transfers numeral or character information input from a user and signals input associated with setting of respective functions and function control of the terminal 100 to the first controller 330. The first input unit 350 can be implemented as a touch screen or a general key pad, and includes character keys in which numerals and characters are arranged, and function keys and soft keys to be selected such that a function can be executed. The first input unit 350 may include a Bluetooth® function key capable of selecting Bluetooth® communication.

The terminal 100 may further include various constructions according to executed functions therein. For example, the terminal 100 may further include an audio processing unit for receiving or outputting sound data, a digital broadcast-receiving unit for receiving digital broadcast data, and a wireless communication unit for performing a voice or video call.

A construction of a secondary device 200 that connects with the terminal 100 through short distance communication, transmits a control signal, or outputs data provided from the terminal 100 will be described with reference to FIG. 4.

Figure 4:
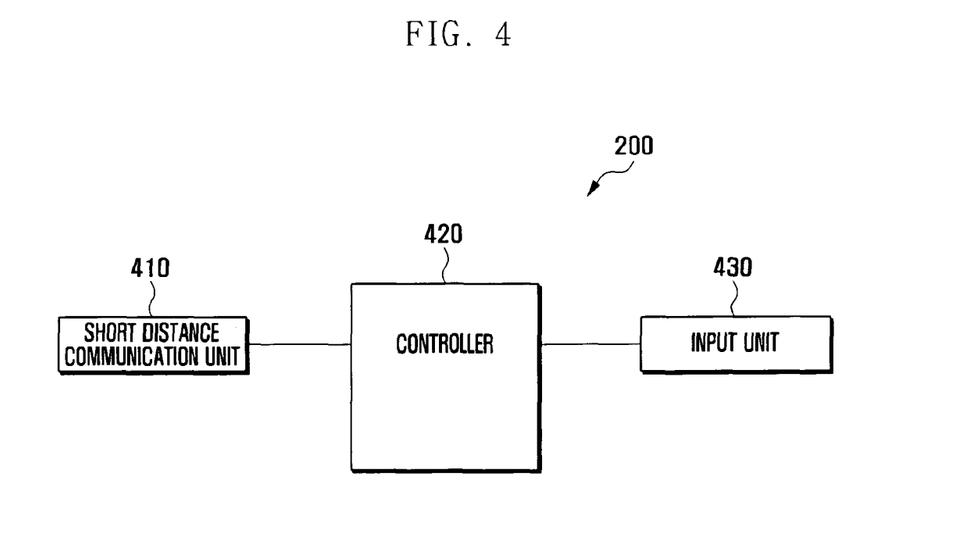
FIG. 4 illustrates a schematic configuration of a secondary device according to an embodiment of the present invention.

FIG. 4 illustrates a schematic configuration of a secondary device according to an embodiment of the present invention.

Referring to FIG. 4, a secondary device 200 includes a short distance communication unit 410, a controller 420, and an input unit 430. Hereinafter, structural elements of the secondary device 200 refer to a second short distance communication unit 410, a second controller 420, and a second input unit 430 to distinguish from those of the terminal 100.

The second short distance communication unit 410 exchanges data with the terminal in a predetermined zone. Here, the second short distance communication unit 410 may transmit a key signal input through a wireless interface to the terminal 100 connected through short distance communication. Moreover, the second short distance communication unit 410 transmits all types of data received from the terminal 100 to the second controller 420.

The second controller 420 controls states and operation of structural elements constituting the secondary device 200. When a short distance communication mode is selected, the second controller 420 controls the second short distance communication unit 410 to connect with the terminal 100 that is requesting wireless connection. The second controller 420 controls the second short distance communication unit 410 to transmit an address allotted to the secondary device 200 and information with respect to a key included in the secondary device 200 to the terminal 100 requesting the wireless connection. The key information includes the number of keys in the secondary device 200 and information with respect to functions mapped to respective keys.

The second input unit 430 transfers signals associated with setting of respective functions input from a user and function control of the secondary device 200 to the second controller 420. Assuming that the secondary device 100 is a headset, the second input unit 430 may include a volume key capable of adjusting a volume, a power key for turning on/off a power supply of the headset, and a call key for outputting voice data received from the terminal 100. The second input unit 430 may also include a play/stop key, a forward key, and a rewind key, which are function keys for controlling multimedia play.

The second input unit 430 transfers signals associated with setting control of respective functions input from a user to the second controller 420. For example, when the secondary device 200 is a headset, the second input unit 430 may include a volume key capable of adjusting a volume, a power key for turning on/off a power supply of the headset, and a call key for outputting voice data received from the terminal 100. The second input unit 430 may include a play/stop key, a forward key, and a rewind key, which are function keys for controlling multimedia play.

Although not shown in the drawings, the secondary device 200 may further include an audio processing unit for exchanging voice data with the terminal 100 according to a function to be executed, and a display unit for displaying the data exchanging with the terminal 100.

This embodiment has described constructions of the terminal 100 and the secondary device 200 that are connected to each other through short distance communication. The following is a description of a protocol stack when short distance communication connection is achieved between the terminal 100 and the secondary device 200 with reference to FIG. 5. Here, the secondary device 200 is described assuming that it is a headset capable of outputting voice data and transmitting a control signal.

Figure 5:
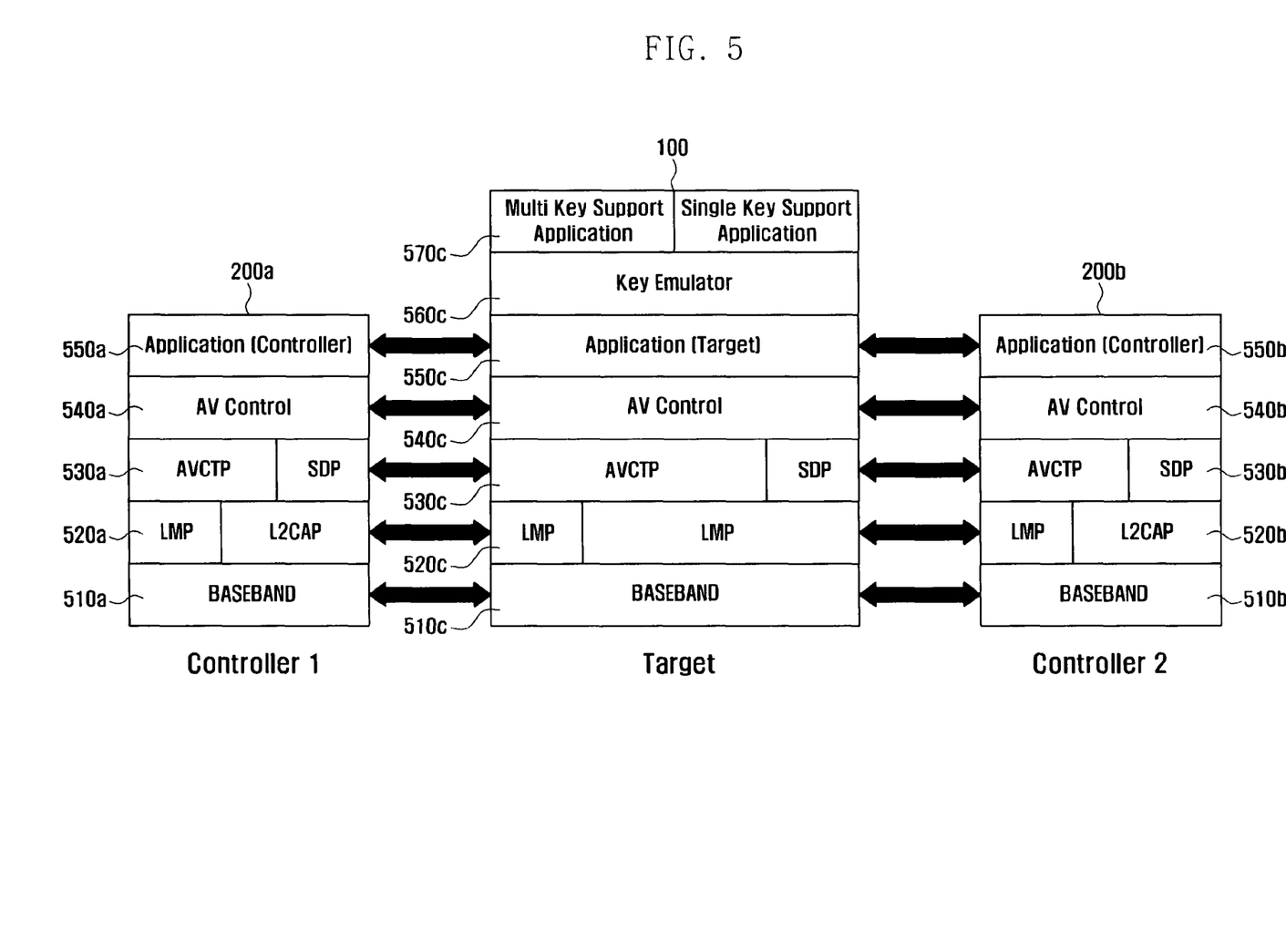
FIG. 5 illustrates a protocol stack between a terminal and a secondary device according to an embodiment of the present invention.

FIG. 5 illustrates a protocol stack between a terminal and a secondary device according to an embodiment of the present invention.

The protocol stack between the terminal 100 and the secondary device 200 can be configured by first layers 510a, 510b, and 510c composed of a baseband; second layers 520a, 520b, and 520c composed of a Link Manager Protocol (LMP) and a Logical Link Control and Adaptation Protocol (L2CAP); third layers 530a, 530b, and 530c composed of Audio/Video Control Transport Protocol (AVCTP) and a Service Discovery Protocol (SDP); fourth layers 540a, 540b, and 540c composed of an audio/video (AV) control protocol; and fifth layers 550a, 550b, and 550c composed of an application executed by the terminal 100 or the secondary device 200. The terminal 100 further includes a sixth layer 560c composed of a key emulator protocol and a seventh protocol 570c composed of a multi-key support application and a single key support application.

The first layers 510a, 510b, and 510c enable a physical RF link between Bluetooth® units (for example, the terminal 100 and the secondary devices 200a and 200b), forming a Piconet. The LMP constituting the second layers 520a, 520b, and 520c is a protocol processing link establishment which forms an Asynchronous Connectionless Link (ACL Link) for exchanging control signals between the terminal 100 and the secondary device 200, and a Synchronous Connection Oriented Link (SCO Link) capable of exchanging various data such as voice data and image data. Meanwhile, L2CAP is a transport protocol that enables transport of up to 64 kilobytes (Kb) of user data with respect to an upper layer protocol and an application.

An SDP among protocols constituting the third layers 530a, 530b, and 530c is a protocol that processes setting and discovery of services in an upper stack of Bluetooth®. An AVCTP is a protocol for controlling transmission of audio and video data.

The fourth layers 540a, 540b, and 540c are configured by profiles controlling transmitted or received audio and video data. An application constituting the fifth layers 560a, 560b, and 560c is achieved by an application executed through Bluetooth® communication.

The sixth layer 560c of the terminal 100 is configured by a protocol for applying a key map according to key information of the first secondary device 200a and the second secondary device 200b connected to the terminal 100. The seventh layer 570c is composed of a multi-key support application and a single key support application that can be executed in the terminal 100.

In the present invention, the L2CAP of the second layers 520a, 520b, and 520c supports one Protocol/Service Multiplexer (PSM), and may discriminate a key signal provided from the respective secondary devices 200a and 200b in the application of the fifth layers 560a, 560b, and 560c through addresses of the respective secondary devices 200a and 200b. The key signals provided from the respective secondary devices 200a and 200b are converted into a key event applied to a current application through a key emulator of the sixth layer 560c included in the terminal 100.

Signal flow for performing function control between the terminal 100 and the secondary device 200 connected through a protocol stack will be described in detail with reference to FIG. 6.

Figure 6:
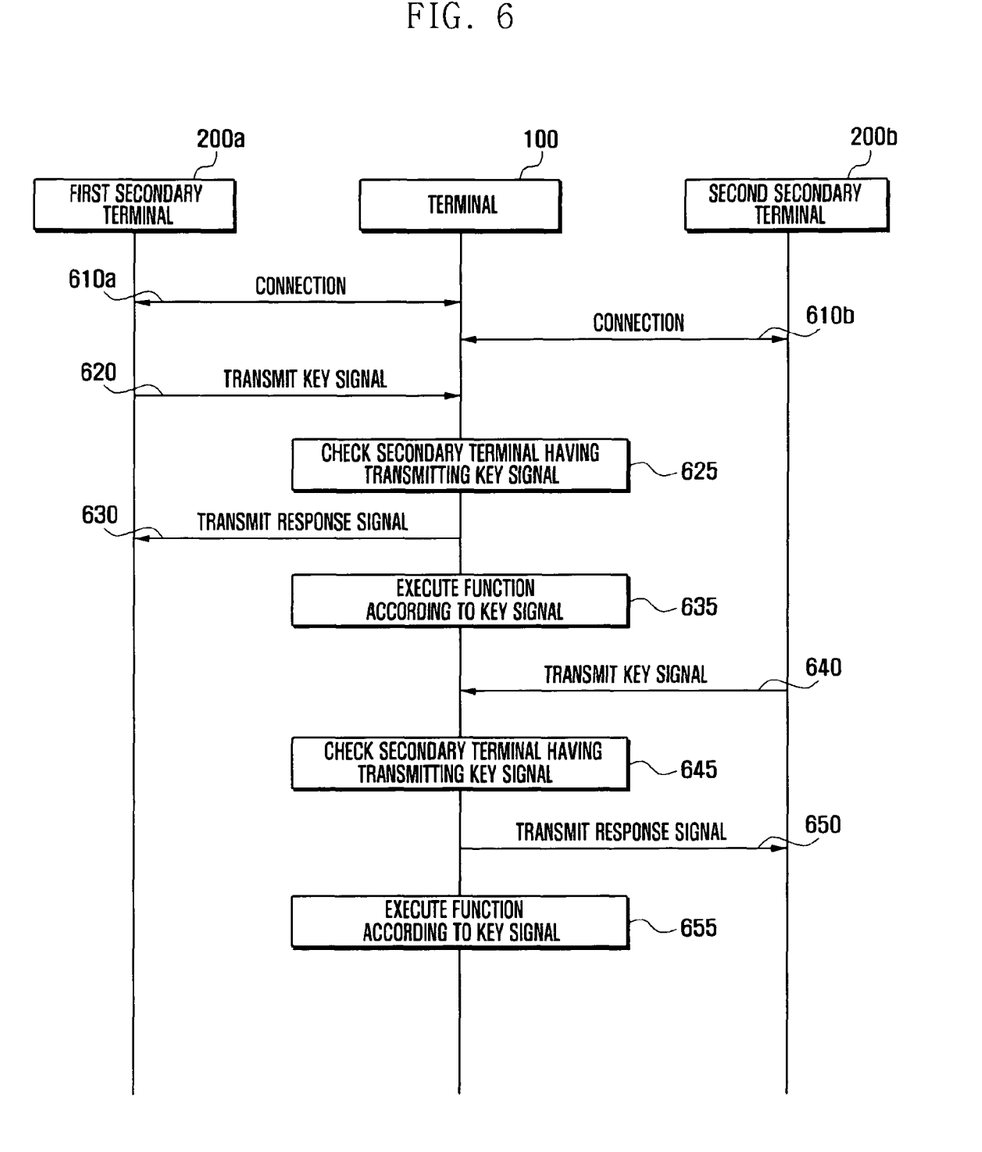
FIG. 6 illustrates a signal flow for function control between a terminal and a secondary device according to an embodiment of the present invention.

FIG. 6 illustrates a signal flow for function control between a terminal and a secondary device according to an embodiment of the present invention.

Referring to FIG. 6, a terminal 100 connects with the first secondary device 200a (610a) and connects with the second secondary device 200b (610b). At this time, the terminal 100 connects with the first secondary device selected by a user through pairing. The terminal 100 connects with a next selected secondary device through pairing. The terminal 100 also forms links for exchanging data with respective secondary devices 200a and 200b. The terminal 100 may store respective addresses provided from respective secondary devices 200a and 200b. Moreover, the terminal 100 checks key information provided from the respective secondary devices 200a and 200b, and applies an appropriate key map to the respective secondary devices 200a and 200b according to the checked key information.

When a key signal from the first secondary device 200a is transmitted (620), the terminal 100 identifies which secondary device 200 transmitted the key signal (625). Next, the terminal 100 transmits a response signal to the first secondary checked terminal 200a (630). In an embodiment, the terminal 100 may compare an address of the secondary device included in the key signal with a stored address to verify that the secondary device that transmitted the key signal.

Then, the terminal 100 executes a function according to the key signal (635). In an embodiment, the terminal 100 checks a key map applied to the first secondary device 200a and determines the function mapped to a received key signal from the checked key map. Subsequently, the terminal 100 executes the checked function.

When the second secondary device 200b transmits a key signal (640), the terminal 100 determines which secondary device transmitted the key signal (645). Next, the terminal 100 transmits a response signal to the second secondary checked terminal 200b (650). At this time, the terminal 100 may also compare an address of the secondary device included in the key signal with a stored address to verify the secondary device that transmitted the key signal. Next, the terminal 100 executes a function according to the key signal (655). In detail, the terminal 100 checks a key map applied to the second secondary device 200a and determines the function mapped to a received key signal from the checked key map. Subsequently, the terminal 100 executes the checked function.

A process for connecting with a plurality of secondary devices 200 and executing a function according to a key signal provided from the plurality of secondary devices 200a and 200b by the terminal 100 will be explained with reference to FIG. 7 to FIG. 9.

Figure 7:
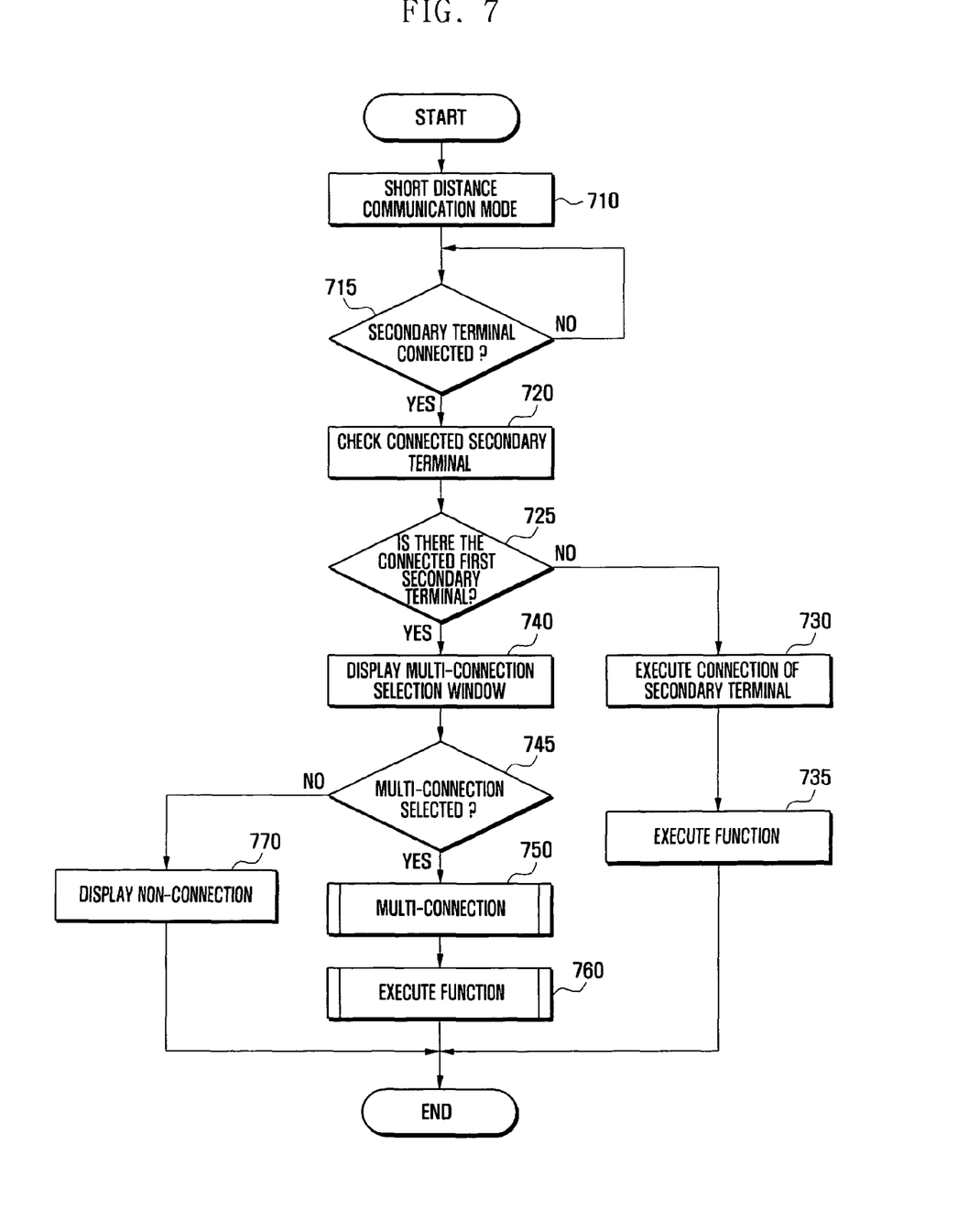
FIG. 7 illustrates a function execution process in a terminal according to an embodiment of the present invention.

FIG. 7 illustrates a function execution process in a terminal according to an embodiment of the present invention.

Referring to FIG. 7, a terminal 100 executes a short distance communication mode according to user selection (block 710). The terminal 100 checks whether connection of a secondary device is selected (block 715). In and embodiment, the terminal 100 detects a secondary device 200 among secondary devices located around the terminal 100 capable of performing short distance communication. Moreover, the terminal 100 displays the secondary device 200 capable of performing short distance communication. Next, the terminal 100 checks whether there is a secondary device 200 selected from among the secondary devices.

When the connection of the secondary device is selected, the terminal 100 checks whether there is a secondary device 200a that is already connected to the terminal (block 720). When there is no previously connected secondary device, the terminal 100 executes connection of the secondary device (block 730). In block 735, the terminal 100 may transmit data to the connected secondary connected terminal or execute a function according to a key signal received from the secondary device 200.

Alternatively, when the first secondary device 200 is already connected to the terminal 100, the terminal 100 displays a multi-connection selection window (block 740). Next, the terminal 100 determines whether multi-connection mode is selected (block 745). When the multi-connection mode is selected, the terminal 100 maintains the connection with the first secondary device 200a previously connected, and establishes a multi-connection by additionally connecting to the second secondary device 200b (block 750).

Block 750 will be described later with reference to FIG. 8. After establishing the multi-connection, the terminal 100 executes functions according to key signals provided from a plurality of secondary devices 200 (block 760). Block 760 will be described later with reference to FIG. 9.

Alternatively, when multi-connection mode is not selected at block 745, the terminal 100 indicates to the user that connection of a plurality of secondary devices 200 is not permitted (block 770). Although not shown in drawings, the terminal 100 checks whether short distance communication mode termination is selected. When the short distance communication mode termination is selected, the terminal 100 cancels the connection with all secondary devices 200. When termination of the short distance communication mode is selected, the terminal 100 executes a function according to a key signal provided from the secondary connected terminal 200. The terminal 100 may determine whether connection of another secondary device 200 is selected, and connect with a plurality of secondary devices 200.

A multi-connection process referred in block 740 of FIG. 7 is described with reference to FIG. 8.

Figure 8:
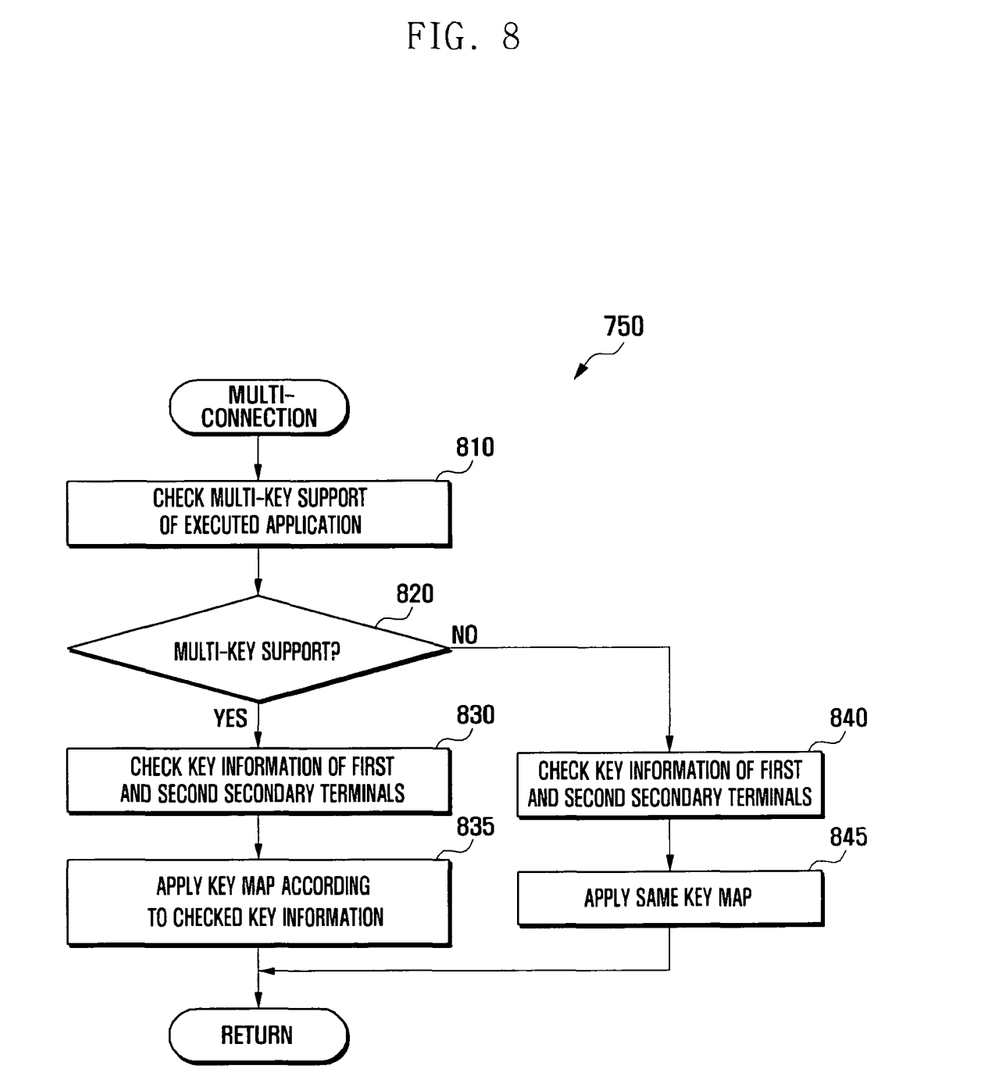
FIG. 8 illustrates a process for connecting with a plurality of secondary devices by a terminal according to an embodiment of the present invention.

FIG. 8 illustrates a process for connecting with a plurality of secondary devices by a terminal according to an embodiment of the present invention.

Referring to FIG. 8, when the multi-connection mode is selected, the terminal 100 performs pairing with a selected secondary device 200*b*. In block 810, the terminal 100 may form a link for exchanging data with the second secondary device 200*b*. In block 820, the terminal 100 detects the presence of multi-key support of an application currently executed in the terminal 100. When the executed application supports a multi-key, the terminal 100 checks key information of the first secondary device 200*a* and the second secondary device 200*b* (block 830). The terminal 100 may determine the device type of the first secondary device 200*a* and the second secondary device 200*b*. That is, the terminal 100 may determine whether each of the connected secondary devices is a headset, a game dedicated remote controller, or a terminal.

In block 835, the terminal 100 applies an appropriate key map according to the checked key information for each of the first secondary device 200*a* and the second secondary device 200*b*. In addition, the terminal 100 may apply a key map based on the device type of the first secondary device 200*a* and the second secondary device 200*b*. For example, when the first secondary device 200*a* is a headset, the second secondary device 200*b* is a game dedicated remote controller, and a currently executed application is a game application, the terminal 100 applies a key map for controlling voice data generated during execution of a game function to the first secondary device 200*a*, and applies a key map for controlling a game function to the second secondary device 200*b*. Here, a game application may be a representative example of applications capable of supporting a multi-key. The multi-key support application refers to an application that may concurrently execute functions according to key signals received from multiple secondary devices.

Alternatively, when the application does not support a multi-key, the terminal 100 checks key information of the first secondary device 200*a* and the second secondary device 200*b* (block 840). In block 845, the terminal 100 applies the same key map to the first secondary device 200*a* and the second secondary device 200*b* (block 845). Here, an MP3 application may be a representative example of an application that does not support the multi-key. Namely, the application that does not support the multi-key refers to an application capable of executing functions according to a key signal received from a single secondary device at one time.

Block 760 of FIG. 7, which is a process for executing a function according to a key signal received from the secondary device 200 by the terminal 100, is explained in detail with reference to FIG. 9.

Figure 9:
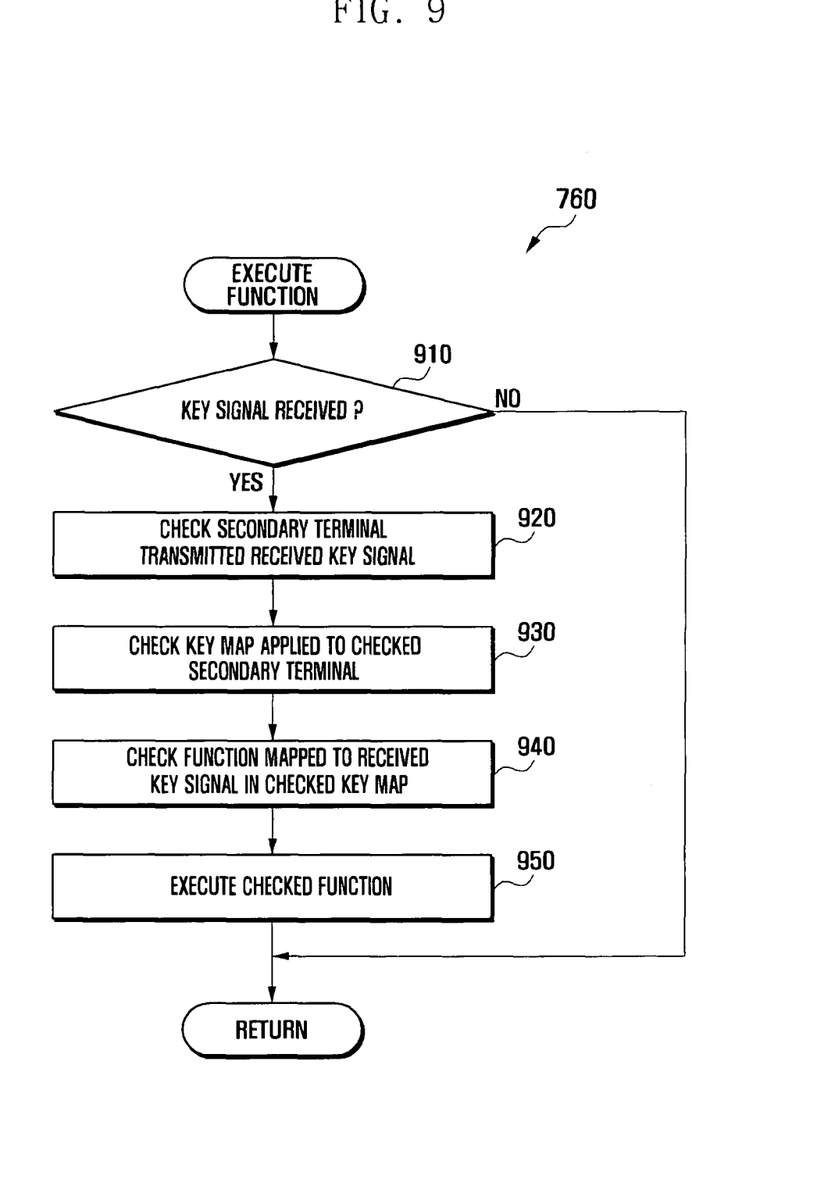
FIG. 9 illustrates a process for executing a function according to a key signal according to an embodiment of the present invention.

FIG. 9 illustrates a process for executing a function according to a key signal according to an embodiment of the present invention.

Referring to FIG. 9, a terminal 100 checks whether a key signal is received through a link formed between the terminal 100 and respective secondary devices 200 (block 910). When the key signal is received, the terminal 100 identifies the secondary device 200 that transmitted the received key signal (block 920). At this time, the terminal 100 may verify the secondary device 200 that transmitted the key signal based on an address of the secondary device 200 included in the key signal.

In block 930, the terminal 100 checks a key map applied to the identified secondary device 200. In block 940, the terminal 100 determines which function is mapped to the key signal received from the secondary device 200 based on the checked key map. In block 950, the terminal 100 executes the determined function (block 950).

Through the foregoing processes, the terminal 100 such as a portable terminal can connect with multiple secondary devices and may execute functions according to key signals provided from the plurality of secondary devices. Through this, multiple users can use various functions using one terminal 100.

In other words, when an application such as an MP3 application is capable of executing one function at one time, the same key map is applied to respective secondary devices 200*a* and 200*b*, such that the respective secondary devices 200*a* and 200*b* can connect with the terminal 100. When an application such as a game application is capable of simultaneously executing functions according to a plurality of key inputs, respective key maps are applied to the secondary devices 200*a* and 200*b*, such that the secondary devices 200*a* and 200*b* can connect with the terminal 100. Accordingly, the terminal 100 may execute corresponding functions according to key signals received from the respective secondary devices 200*a* and 200*b*.

In the present invention, one terminal may connect with a plurality of secondary devices. Moreover, the terminal may recognize control signals received from a plurality of secondary devices to execute functions accordingly. Accordingly, a user may share one terminal with plural users to use various functions such as a game.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A function control method of a terminal using short distance communication, comprising:
   connecting with at least two secondary devices by short distance communication;
   applying a corresponding key map to each of the connected secondary devices, the terminal having an executed application for executing functions according to key signals received from the at least two connected secondary devices;
   identifying which of the connected secondary devices transmitted a key signal when the key signal is received; and
   executing a function mapped to the key signal according to the key map applied to the identified secondary device.

2. The method of claim 1, wherein applying the corresponding key map comprises:
   determining whether the executed application supports the multi-key;
   checking key information for each of the connected secondary devices when the executed application supports the multi-key; and
   applying the corresponding key map to each of the connected secondary devices according to the respective checked key information.

3. The method of claim 2, further comprising applying the same key map to each of the connected secondary devices when the executed application does not support the multi-key.

4. The method of claim 1, wherein connecting with at least two secondary devices by short distance communication comprises:
   determining whether at least one other secondary device is already connected to the terminal when connection of a new secondary device is requested;
   determining whether a multi-connection option is selected when at least one secondary device is already connected to the terminal;

connecting with the new secondary device for which connection is requested while maintaining connection with at least one connected secondary device when the multi-connection is selected; and applying the key map to the connected secondary devices.

5. The method of claim 4, further comprising displaying an indication that the new secondary device cannot be connected when the multi-connection is not selected.

6. The method of claim 4, wherein connecting with the new secondary device while maintaining connection with at least one connected secondary device comprises:
determining whether the executed application supports the multi-key;
checking key information for each of the connected secondary devices when the executed application supports the multi-key; and
applying the corresponding key map to each of the connected secondary devices according to the respective checked key information.

7. The method of claim 4, wherein identifying which of the connected secondary devices transmitted the key signal comprises:
comparing an address included in the key signal with at least one stored address of connected secondary devices.

8. A function control terminal, comprising:
a controller configured to:
connect the terminal with at least two secondary devices by short distance communication;
apply a corresponding key map to each of the connected secondary devices, the terminal having an executed application for executing functions according to key signals received from the at least two connected secondary devices;
identify which of the connected secondary devices transmitted when the key signal is received; and
execute a function mapped to the key signal according to the key map applied to the identified secondary device; and
a short distance communication unit configured to receive a key signal from at least one of the connected secondary devices in a short distance communication mode.

9. The function control terminal of claim 8, wherein the controller is configured to determine whether the executed application supports the multi-key, check key information for each of the connected secondary devices when the executed application supports the multi-key, and apply the corresponding key map to each of the connected secondary devices according to the respective checked key information.

10. The function control terminal of claim 9, wherein the controller is configured to apply the same key map to each of the connected secondary devices when the executed application does not support the multi-key.

11. The function control terminal of claim 8, wherein the controller is configured to determine whether at least one other secondary device is already connected to the terminal when connection of a secondary device is requested, determine whether a multi-connection option is selected when at least one secondary connected device is already connected to the terminal, connect with the new secondary device for which connection is requested while maintaining connection with at least one connected secondary device when the multi-connection is selected, and apply the key map to the connected secondary devices.

12. The function control terminal of claim 11, wherein the controller is configured to output an indication that the new secondary device cannot be connected when the multi-connection is not selected.

13. The function control terminal of claim 11, wherein the controller, when connecting to the new secondary device while maintaining connection with at least one connected secondary device, is further configured to:
determine whether the executed application supports the multi-key,
check key information for each of the connected secondary devices when the executed application supports the multi-key; and
apply the corresponding key map to each of the connected secondary devices according to the respective checked key information.

14. The function control terminal of claim 11, wherein the controller is configured to compare an address included in the key signal with at least one stored address of connected secondary devices to identify which of the connected secondary devices transmitted the key signal.

15. A non-transitory computer readable medium comprising software for allowing a terminal to receive input from multiple secondary devices concurrently through a short distance communication mode, the non-transitory computer readable medium comprising instructions for:
connecting with at least two secondary devices in the short distance communication mode;
applying a corresponding key map to each of the connected secondary devices, the terminal having an executed application for executing functions according to key signals received from the at least two connected secondary devices;
identifying which of the connected secondary devices transmitted a key signal when the key signal is received; and
executing a function mapped to the key signal according to the key map applied to the identified secondary device.

16. The non-transitory computer readable medium of claim 15, connecting with at least two secondary devices in the short distance communication mode comprises:
determining whether at least one other secondary device is already connected to the terminal when connection of a new secondary device is requested;
determining whether a multi-connection option is selected when at least one secondary device is already connected to the terminal;
connecting with the new secondary device for which connection is requested while maintaining connection with at least one connected secondary device when the multi-connection is selected; and
applying the key map to the connected secondary devices.

17. The non-transitory computer readable medium of claim 16, wherein applying the corresponding key map comprises:
determining whether the executed application supports the multi-key;
checking key information for each of the connected secondary devices when the executed application supports the multi-key; and
applying the corresponding key map to each of the connected secondary devices according to the respective checked key information.

18. The non-transitory computer readable medium of claim 17, further comprising instructions for applying the same key map to each of the connected secondary devices when the executed application does not support the multi-key.

19. The non-transitory computer readable medium of claim 16, further comprising instructions for providing an indication that the new secondary device cannot be connected with the multi-connection is not selected.

20. The non-transitory computer readable medium of claim 15, wherein identifying which of the connected secondary devices transmitted the key signal comprises:
 comparing an address included in the key signal with at least one stored address of connected secondary devices.

* * * * *